Feb. 15, 1944. H. KLEMPERER 2,341,562
ELECTRICAL CONTROL SYSTEM
Filed March 24, 1942
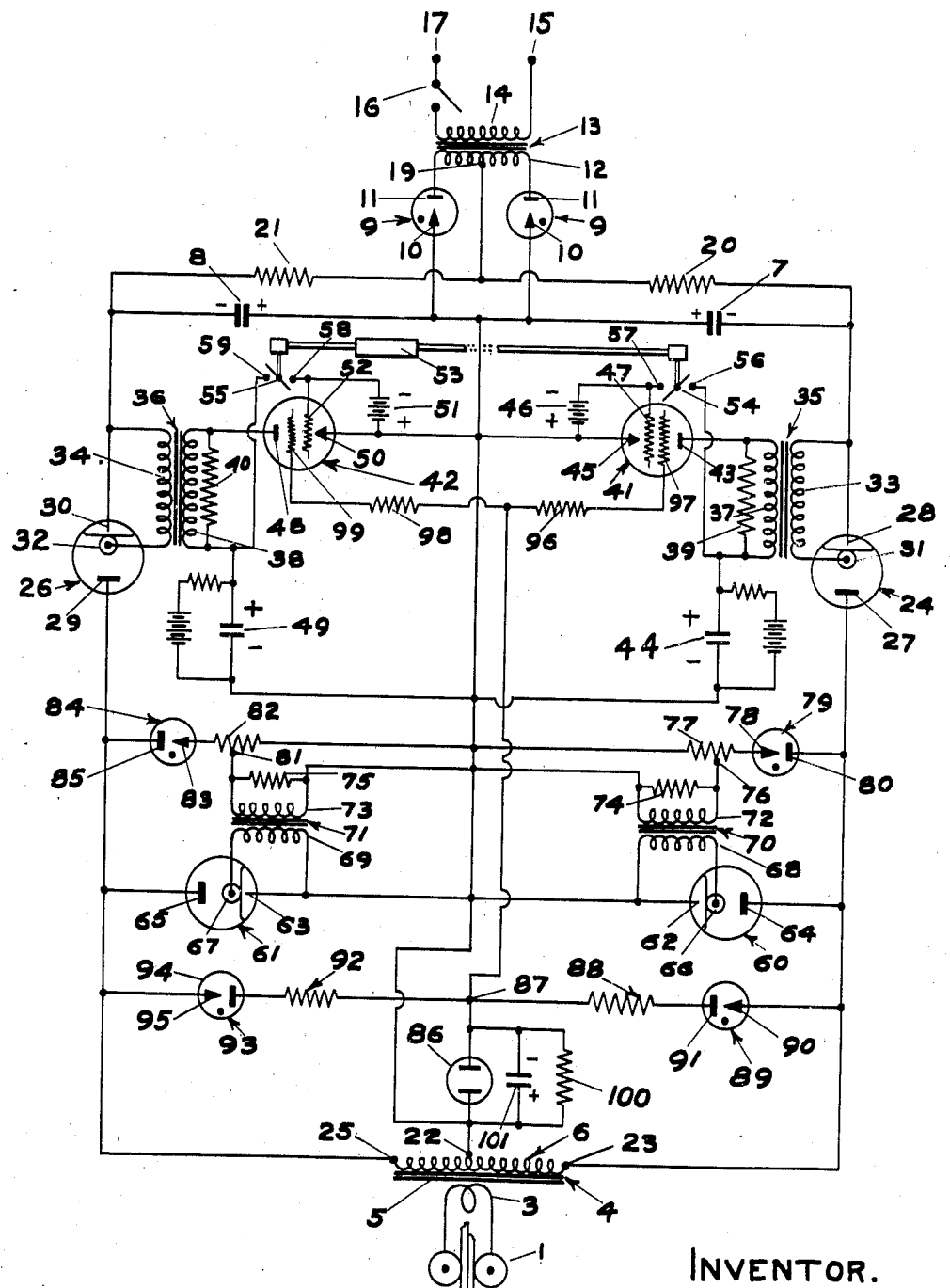
INVENTOR.
HANS KLEMPERER,
BY Elmer J. Gorn
ATTY.

Patented Feb. 15, 1944

2,341,562

UNITED STATES PATENT OFFICE 2,341,562

ELECTRICAL CONTROL SYSTEM

Hans Klemperer, Belmont, Mass., assignor to Raytheon Manufacturing Company, Newton, Mass., a corporation of Delaware Application March 24, 1942, Serial No. 435,979

14 Claims. (Cl. 171—97)

This invention relates to electrical systems of the type in which intermittent pulses of current are supplied to an inductance, and more particularly to systems of this type which employ electrical space discharge devices for controlling the supply of pulses to said inductances.

In certain systems of the type hereinabove described, if two or more pulses of current are supplied to the inductance at the same time; or if before one pulse of current supplied to the inductance has completely decayed, another pulse of current is supplied to said inductance; harmful effects may ensue. The first of these conditions may be called "coincidence" of pulses of current and the second of these conditions may be called "overlapping" of pulses of current. However, in this specification and the claims, except where the text specifically indicates otherwise, the term "overlapping" is intended to include coincidence which latter may be considered as 100% overlapping of pulses.

Examples of such systems are found in certain welding systems, such as those described in the copending application of John Dawson, Serial No. 312,402, filed January 4, 1940, for an improvement in Resistance welding systems, in which pulses of current are fed alternately in opposite directions through an inductance. In said welding systems, if two pulses of current overlap they diminish the effective impedance of the inductance, thereby producing a surge of current of relatively high magnitude which results in undesirable effects. Overlapping of pulses is most likely to occur in seam welding systems where the welds and the pulses for producing such welds follow each other in rapid succession.

An object of this invention is the provision of means for preventing overlapping of pulses of current.

In such systems the supplying of pulses of current to an inductance is controlled by electrical space discharge devices. Therefore, another object of this invention is the provision of means for positively controlling said electrical space discharge devices to prevent overlapping of pulses of current supplied to the inductance.

Another object of this invention is the provision of means to permit rapid operation of systems of the general character described and in particular of seam welding systems.

Other and further objects of this invention will become apparent and the foregoing objects will be best understood for the following description of an exemplification thereof, reference being had to the drawing in which the figure is a schematic diagram of a resistance welding system embodying my invention, in which figure a plurality of condenser means are discharged in opposite directions through the inductance of a welding transformer.

In the figure, welding current is to be supplied to a pair of rotatable welding electrodes or wheels 1 adapted to roll on the work 2 which is to be welded. The current is to be supplied to the electrodes in successive pulses of welding current so as to perform successive welding operations. Each welding operation welds a spot on the work 2, these spots preferably overlapping so as to form a continuous seam welding. The electrodes 1 are connected to the secondary 3 of a welding transformer 4. This welding transformer is provided with a core member 5 made of magnetic material. The welding transformer 4 is also provided with a primary winding 6 adapted to be energized by the discharge from a pair of relatively large condensers 7 and 8. These condensers are adapted to be charged from any suitable source of direct current such as a direct current generator, battery, rectifier or the like. In the drawing the direct current is shown as being supplied from a pair of rectifier tubes 9. These tubes may be of the gas or vapor-filled type having a continuously energized cathode 10. These cathodes may be thermionic filaments or any other suitable type of cathode. The rectifier tubes 9 are provided with anodes 11 which are connected to opposite sides of the secondary winding 12 of a charging transformer 13. The primary winding 14 of the charging transformer 13 has one end thereof directly connected to a terminal 15 and the other end thereof connected through a switch 16 to a terminal 17. The terminals 15 and 17 are adapted to be connected to a suitable source of alternating current.

The cathodes 10 of tubes 9 are connected together and to the positive sides of condensers 7 and 8. The secondary winding 12 of the charging transformer 13 is provided with a center tap 19. Tap 19 is connected to the negative side of condenser 7 through a current limiting impedance 20, and tap 19 is connected to the negative side of condenser 8 through another current limiting impedance 21. The value selected for impedances 20 and 21 is that which will charge condensers 7 and 8 at the proper charging rate. These impedances may be resistances, or if high efficiency is desired, may be inductances.

The positive sides of condensers 7 and 8 are connected to a center tap 22 provided on the primary 6 of the welding transformer 4. The negative side of condenser 7 is adapted to be connected to one end 23 of primary 6 through a controlled ignition discharge tube 24. The negative side of condenser 8 is adapted to be connected to the end 25 of the primary 6 through a controlled ignition discharge tube 26. These tubes are preferably of the pool cathode type with an igniter for initiating a cathode spot on the pool in order to cause the tube to conduct current. Although any suitable type of igniter may be used, it is preferably of the kind described and claimed in the copending application of Percy L. Spencer, Serial No. 303,963, filed November 13, 1939 for an improvement in Arc igniting devices, consisting of a conductor separated and insulated from the cathode by a thin glass layer. The tube 24 is provided with an anode 27 connected to end 23 of primary winding 6, and with a pool cathode 28 connected to the negative side of condenser 7. Likewise, tube 26 is provided with an anode 29 connected to end 25 of primary 6 and with a pool cathode 30 connected to the negative side of condenser 8. The tubes 24 and 26 are also provided with igniters 31 and 32, respectively, preferably of the type explained above. The igniters 31 and 32 are supplied with igniting impulses from secondary windings 33 and 34 of igniting transformers 35 and 36, respectively. Said igniting transformers are provided with primary windings 37 and 38, respectively. Resistance 39 is connected across the primary winding 37 and resistance 40 is connected across the primary winding 38.

The supply of igniting impulses to primaries 37 and 38 is preferably controlled by control tubes 41 and 42, respectively. These tubes may be of the grid-controlled gaseous rectifying type having two grids and a continuously-energized cathode. One end of primary 37 is connected to the anode 43 of tube 41 and the other end of primary 37 is connected to the positively charged side of a condenser 44 which provides potential for the anode 43. Condenser 44 may be charged by a battery in series with a current limiting resistance. The negative side of condenser 44 is connected to the cathode 45 of tube 41. Normally the tube 41 is intended to be non-conducting and for this purpose a grid bias battery is provided having its positive terminal connected to the cathode 45 and its negative terminal connected to the first grid 47, which is the grid nearest the cathode.

Similarly, the primary 38 has one end thereof connected to anode 48 of tube 42 and the other end thereof connected to the positive side of a condenser 49 for applying a potential to anode 48. The negative terminal of condenser 49 is connected to the cathode 50 of tube 42. The condenser 49 is charged by a battery in series with a resistance. A grid bias battery 51 has its positive terminal connected to the cathode 50 and its negative terminal to the first grid 52 of tube 42. Cathode 45 of tube 41 and cathode 50 of tube 42 are connected together and to the positive sides of condensers 7 and 8.

In order to alternately fire tubes 41 and 42 to thereby supply alternate igniting impulses to the primaries of their respective igniting transformers, a timer 53 is provided. The timer 53 may be synchronized with the rolling of the welding electrodes 1 over the work 2. Various types of timers may be used for this purpose as will be readily apparent to one versed in the art. The timer illustrated is provided with a pair of rotatable connecting arms 54 and 55. Arm 54 is adapted to connect contacts 56 and 57, contact 56 being connected to the positive side of condenser 44 and contact 57 being connected to the first grid 47 of the tube 41. Arm 55 is adapted to connect contacts 58 and 59, contact 58 being connected to the first grid 52 of tube 42 and contact 59 being connected to the positive side of condenser 49. It will be seen that when contacts 56 and 57 are connected, the condenser 44 will apply a positive potential to the grid 47 overcoming the negative bias of grid 46, thus causing tube 41 to conduct. Similarly it will be seen that when contacts 58 and 59 are connected together, the grid 52 will be connected to the positive side of condenser 49 which will overcome the negative bias of battery 51 and thus cause tube 42 to conduct. In order to alternately fire tubes 24 and 26, arms 54 and 55 are preferably arranged to alternately make contact with their respective contacts.

It will be seen that when tube 24 is ignited a welding impulse is supplied to the right side of primary 6 of the welding transformer 4 between center tap 22 and end 23. When tube 26 is fired a welding impulse is sent through the other half of the primary 6 in the opposite direction.

In order to make each welding current impulse substantially unidirectional with exponential decay, a pair of controlled ignition discharge tubes 60 and 61, preferably of the same type as tubes 24 and 26, is provided. Tubes 60 and 61 have their cathodes 62 and 63, respectively, connected together and to tap 22 on the primary 6. Anode 64 of tube 60 is connected to end 23 of the primary winding 6 while anode 65 of tube 61 is connected to end 25 of the primary winding 6. Tube 60 and 61 are provided with igniters 66 and 67, respectively, preferably of the type heretofore described. These igniters are supplied with igniting impulses from the secondary windings 68 and 69 of igniting transformers 70 and 71, respectively, each of said secondaries having its ends connected to its associated igniter 66 or 67 and cathode 62 or 63, respectively. Primaries 72 and 73 of igniting transformers 70 and 71 have resistances 74 and 75, respectively, arranged across them. One end of each of said primaries are connected together and to tap 22 of the primary 6 of the welding transformer. The other end of primary winding 72 is connected to a tap 76 on a resistance 77. One end of resistance 77 is connected to tap 22 of the primary winding 6. The other end of said resistance is connected to the cathode 78 of a rectifier tube 79. Tube 79 is preferably of the gas-filled type having a cathode 78 of the permanently energized type. Anode 80 of tube 79 is connected to end 23 of primary winding 6. Similarly the other end of the primary 73 of igniting transformer 71 is connected to a tap 81 on a resistance 82, one end of resistance 82 being connected to the tap 22 of primary winding 6 while the other end of resistance 82 is connected to the cathode 83 of a rectifier tube 84 similar to rectifier tube 79. Anode 85 of rectifier tube 84 is connected to end 25 of primary winding 6.

In order to set the system in operation switch 16 is first closed and condensers 7 and 8 are charged. The timer 53 is started. Assuming that conducting arm 54 makes contact with its contacts 56 and 57 first, the grid 47 of tube 41 which has held off conductance in tube 41 because of the negative bias of battery 46 thereon, has the positive bias of condenser 44 placed thereon which overcomes the bias of battery 46, causing tube 41 to conduct and supplying an igniting impulse through igniting transformer 35 to tube 24. Condenser 7, which has been charged upon closing of switch 16, now discharges through the right side of the primary 6, through the tube 24, and thus a pulse of welding current is supplied to the welding load. This discharge of condenser 7 causes the voltage across it to fall to zero when substantially maximum discharge current is flowing from said condenser. Thereupon the potential across the right side of the primary winding 6 tends to reverse due to the inductance of the associated circuit, and the current tends to continue to flow in the same direction. Previous to this time the polarity of the potential across the anode 64 and cathode 62 of tube 60 was such as to oppose igniting of said tube. However, upon reversal of the potential, tube 60 is ready to fire and will fire when an igniting impulse is supplied thereto. When the voltage across the right side of primary 6 reverses the voltage across condenser 7 also reverses. The reversal of voltage is utilized to supply an igniting impulse to the igniting transformer 70 of tube 60. This impulse is derived through the conduction of tube 79. Upon reversal of the potential across the upper side of primary 6 a positive potential is applied to anode 80 relative to cathode 78. Tube 79 thereupon conducts and the voltage drop between tap 76 of resistance 77 and the end of said resistance connected to tap 22 is utilized to supply an igniting impulse to the primary 72 of igniting transformer 70. Tube 60 then fires and current flows through the right side of primary 6 and through said tube 60. Tube 24 is thereupon extinguished while the current flowing through the upper side of primary 6 decays exponentially to the point where the voltage applied to anode 64 is insufficient to maintain ignition of said tube 60 whereupon the tube 60 is extinguished.

The timer 53 continues to turn and conducting arm 55 next makes contact with its contacts 58 and 59 causing tube 42 to conduct and thereby supplying an energizing impulse to tube 26. Thereupon tube 26 fires and condenser 8 discharges through the left side of the primary winding 6 and through said tube 26. As the current flows through the left side of primary winding 6 the potential across said winding reverses whereupon tube 84 becomes conducting and supplies an energizing impulse to tube 61. Upon the firing of tube 61 the current passing through the left side of primary 6 is shunted through tube 61 and tube 26 is extinguished. The current passing through the left side of primary winding 6 thereupon decays exponentially until the potential on anode 65 of tube 61 is insufficient to maintain ignition of said tube, whereupon said tube is extinguished.

It will be seen that the supply of pulses of current to primary 6 is dependent upon the firing of tubes 24 and 26. The firing of these tubes is in turn dependent upon the speed of rotation of the timer. If either tube 24 or tube 26 is fired before a pulse of current previously supplied to primary winding 6 has completely decayed, certain harmful effects, such as undesirably large surges of current, may occur. Particularly in seam welding, where welds and welding pulses are adapted to follow each other rapidly, such overlapping of pulses is most likely to occur.

In accordance with my invention I prefer to provide a means for positively preventing tubes 24 and 26 from being fired while a pulse of current is still passing through primary winding 6. Said means is adapted to prevent such firing regardless of whether the contact arms 54 or 57 are making contact with their respective contacts.

For the aforementioned purpose I prefer to utilize a cut-off bias potential on both control tubes 41 and 42 to prevent either of said tubes from conducting and supplying igniting impulses to tubes 24 and 26. Tubes 41 and 42 are designed so that negative bias on their second grids will prevent operation regardless of the positive bias on their first grids. The cut-off bias potential is derived from the potential generated in primary 6 by the passage of current therethrough. The potential in primary 6 may be applied across an impedance, the voltage drop across the impedance being directly used to bias tubes 41 and 42.

In order that the cut-off bias applied to tubes 41 and 42 be constant I prefer to use a constant voltage drop device such as a glow discharge device 86. Glow discharge device 86 has one end thereof connected to tap 22 of primary winding 6, and the other end 87 thereof connected through a series resistance 88 and a rectifier tube 89 to end 23 of the primary winding 6. Rectifier tube 89 which may be similar to tube 79 heretofore described, preferably has a permanently energized cathode 90 which is connected to end 23 of primary 6. Anode 91 of tube 89 is connected to the resistance 88. It will therefore be seen that potential existing across the right end of the primary winding 6 will be impressed upon the glow tube 86 through tube 89 and resistance 88. Similarly a potential existing across the left side of primary winding 6 will be impressed across said glow discharge tube 86 through a similar resistance 92 and a rectifier tube 93. Resistance 92 has one end thereof connected to end 87 of glow discharge tube 86 and has its other end connected to anode 94 of rectifier tube 93. Rectifier 93, which may be similar to tube 89, has its permanently energized cathode 95 connected to end 25 of the primary winding 6. As stated before the fall of potential across glow discharge tube 86 is used to provide cut-off bias on tubes 41 and 42 to prevent said tubes from conducting and thereby firing tubes 24 and 26. For this purpose the side of glow discharge tube 86 connected to tap 22 is connected to the cathodes 45 and 50 of tubes 41 and 42. Side 87 of glow discharge tube 86 is connected in series with resistance 96 to the second grid 97 of tube 41, and in series with resistance 8 to the second grid 99 of tube 42. It will therefore be seen that the fall of potential across glow discharge tube 86 is applied to the grids of tubes 41 and 42 and provides a bias thereon.

In operation, the cut-off bias is applied to tubes 41 and 42 as follows. If tube 24 is fired, current will start flowing from tap 22 to tap 23 on the right side of primary winding 6. A potential is generated across said side and tap 22 will be positive relative to tap 23. Hence a positive potential will be applied to anode 91 of tube 89 through glow discharge tube 86. Glow discharge tube 86 and tube 89 will thereupon conduct and current will flow through glow discharge tube 86, resistance 88 and tube 89. A difference of potential will be established across glow discharge tube 86 with side 87 of said tube being negative in relation to its other side. Therefore, a negative bias is applied to grids 97 and 99 of tubes 41 and 42 thereby preventing said tubes from conducting. It will thus be seen that when tube 24 has fired there will immediately be applied to both tubes 41 and 42 a cut-off bias which prevents either of said tubes from firing and supplying energizing impulses to tubes 24 or 26. However, as stated hereinbefore the potential across the right side of primary winding 6 will decline and reverse itself. When the potential across the right hand side of primary winding 6 has declined to a sufficiently low point where conduction will no longer occur in tube 89 because of the decline of the positive potential on anode 91 or when glow discharge tube 86 ceases to conduct because of the decline of potential no cut-off bias would be applied to prevent tubes 24 or 26 from being fired. In order to carry over this cut-off bias during the period when the potential across the right hand side to winding 6 has declined and before the potential has reversed and grown large enough to again establish a cut-off bias as will be hereinafter described, I prefer to provide a condenser 101 arranged across glow discharge tube 86. During the time that either tube 89 or 93 is conducting and current is passing through the circuit including said glow discharge tube condenser 101 is charged. When both tubes 89 and 93 no longer conduct condenser 101 supplies the cut-off bias to tubes 41 and 42.

It will be seen that when the potential across the upper side of primary winding 6 is reversed and current therein is decaying, a potential is induced in the lower side of said primary winding which is in a direction to cause tube 87 to conduct. Tube 87 then conducts and current passes from tap 22 of primary winding 6 through the glow tube 86, series resistance 92 and tube 93 to end 25 of primary winding 6. Conduction of tube 93 again maintains the difference of potential between point 87 and tap 22, which potential serves to bias grids 97 and 99 of tubes 41 and 42, respectively, so that said tubes do not conduct and therefore do not supply igniting impulses to ignition tubes 24 and 26, respectively. The shunt tube 60 which, as explained hereinbefore, is fired upon reversal of the potential across the upper end of primary 6 continues to conduct the current until said current has decayed to the point where the potential on anode 64 is insufficient to maintain ignition of said tube whereupon tube 60 is extinguished and current ceases to flow through the primary winding.

From the foregoing it will be seen that whenever current flows in either direction through the halves of primary winding 6 a potential will be generated by said current flow to produce a voltage drop across glow discharge lamp 86 and thus provide a negative bias on the ignition control tubes 41 and 42. There is a brief interval, however, between the time the circuit through tube 89 is conducting and the time in which the circuit including tube 87 is conducting in which the cut-off bias is supplied by condenser 101. After current in the primary winding 6 has completely ceased to flow it is preferred that condenser 101 be discharged. For this purpose a resistance 100 may be provided arranged across said condenser. The value of resistance 100 is preferably such that condenser 101 is not discharged until a short interval after the current in primary winding 6 has completely ceased. This value of resistance 100 assures complete decay of current in primary winding 6 before a new pulse of current can be supplied to said winding by a firing of tube 24 or tube 26. The value of the resistance 100 is also preferably high enough so that condenser 101 will not be discharged during the interval in which the potential across either half of the primary winding 6 has declined and is reversing. For highest speed of operation said resistance is preferably made as small as possible while leaving a sufficient margin of safety to insure complete decay of current in the primary 6 and carry-over of the cut-off bias during reversal of potential in said primary.

After the charge on condenser 101 has leaked off, tube 26 may be fired. The firing of tube 26 discharges condenser 8 into the left side of primary winding 6. Glow discharge tube 86 and control tube 93 almost immediately begin to conduct current and cut-off bias is thereby applied to the grids 97 and 99 of tubes 41 and 42. Upon reversal of potential tube 93 goes out and tube 89 conducts, while during the interval existing between the extinguishing of tube 93 and the conduction of tube 89, condenser 101 supplies the cut-off bias.

From the foregoing it will therefore be seen that I have provided positive means for preventing the supply of a pulse of current to primary 6 before a previously supplied pulse of current has completely decayed.

While I have described a specific embodiment of my invention it is to be understood that this invention is not limited to the particular details hereinabove set forth inasmuch as many equivalents and variations will suggest themselves to those skilled in the art from the teachings of this invention. For example, other types of discharge tubes or circuit connecting means may be utilized instead of the tubes shown. Various other circuits and arrangements using ideas here suggested for preventing establishment of circuits for supplying impulses to an inductance while a pulse of current in said inductance is still alive may be employed. Various other ideas as to the utilization of the principles enunciated and claimed herein will suggest themselves to those skilled in the art from the description herein. It is accordingly desired that the appended claims be given a broad interpretation commensurate with the scope of the invention within the art.

What is claimed is:

1. In an electrical system, an inductance, a first circuit for successively supplying pulses of current to said inductance, a second circuit including said inductance and adapted to produce a varying current flow therein, and means responsive to a difference of potential in said inductance for preventing establishment of said first circuit.

2. In combination a welding transformer, a first circuit for supplying pulses of current to said transformer, a second circuit including said transformer and adapted to produce a varying current flow therein, and means responsive to a difference of potential in said inductance for preventing establishment of said first circuit.

3. In an electrical system, an inductance, a first circuit for successively supplying pulses of current to said inductance, a second circuit for supplying pulses of current to said inductance, and means for preventing establishment of said first circuit, said preventing means being responsive to a difference of potential in said inductance, to thereby prevent the supply of additional pulses of current to said inductance before the current therein has completely decayed.

4. In an electrical system, an inductance, a plurality of circuits for supplying pulses of current to said inductance and means responsive to a difference of potential in said inductance for preventing establishment of one of said circuits, said preventing means being operative during the establishment of another of said circuits, to thereby prevent the supply of additional pulses of current to said inductance before a previously supplied pulse has completely decayed.

5. In an electrical system, an inductance, a first circuit for successively supplying pulses of current to said inductance, the potential across said inductance being in one direction upon the rise of each pulse of current and reversing upon the decay of each said pulse, a second circuit including said inductance and adapted to produce a varying current flow therein, means responsive to a difference of potential in said inductance for preventing establishment of said first circuit and means for maintaining operation of said preventing means during reversal of potential across said inductance.

6. In an electrical system, an inductance, a first circuit for successively supplying pulses of current to said inductance said circuit including a tube adapted to be fired in supplying a pulse of current to said inductance, means for firing said tube, a second circuit including said inductance and adapted to produce a varying current flow therein, and means responsive to a difference of potential in said inductance for preventing firing of said tube, to thereby prevent the supply of additional pulses of current to said inductance before a previously supplied pulse has completely decayed.

7. In an electrical system, an inductance, a first circuit for successively supplying pulses of current to said inductance the potential across said inductance being in one direction upon the rise of each pulse of current and reversing upon the decay of each said pulse, a second circuit for supplying pulses of current to said inductance, said second circuit including a tube adapted to be fired in supplying a pulse of current to said inductance, means for firing said tube, means responsive to a difference of potential in said inductance for preventing firing of said tube and means for maintaining operation of said preventing means during reversal of potential across said inductance.

8. In an electrical system, an inductance, a circuit for successively supplying pulses of current to said inductance, the potential across said inductance being in one direction upon the rise of each pulse of current and reversing upon the decay of each said pulse, said circuit including a tube adapted to be fired in supplying a pulse of current to said inductance and a shunt tube adapted to conduct current upon reversal of the potential across said inductance, means for firing said first-mentioned tube, and means responsive to a difference of potential in said inductance for preventing operation of said firing means.

9. In an electrical system, an inductance, a circuit for successively supplying pulses of current to said inductance in one direction, a second circuit for supplying pulses of current to said inductance in the opposite direction, a pair of rectifying tubes arranged in shunt across said inductance, the polarities of said tubes being inversely arranged, one of said tubes being adapted to conduct current when the potential across said inductance is in one direction, the other of said tubes being adapted to conduct current when the potential across said inductance is in the opposite direction, and means responsive to the flow of current through either of said rectifying tubes for preventing establishment of either of said circuits.

10. In an electrical system, an inductance, a circuit for successively supplying pulses of current to said inductance in one direction, a second circuit for supplying pulses of current to said inductance in the opposite direction, a rectifying tube arranged to conduct current when the potential across said inductance is in one direction, another rectifying tube arranged to conduct current when the potential across said inductance is in the opposite direction, means responsive to the flow of curernt through either of said rectifying tubes for preventing establishment of either of said circuits, a condenser adapted to be charged by the flow of current through either of said rectifying tubes, said condenser being adapted to maintain operation of said preventing means during reversal of the potential across said inductance and means for discharging said condenser.

11. In an electrical system, an inductance, a circuit for supplying pulses of current to said inductance, said circuit including a circuit-closing device adapted upon closing thereof to permit current to flow through said circuit into said inductance, said circuit-closing device being arranged to be opened before a pulse of current thus supplied to said inductance has completely decayed, means for causing said pulse to continue to flow through said inductance after said circuit-closing device has opened, and means responsive to the voltage across said inductance for preventing the closing of said circuit-closing device until said pulse has substantially completely decayed.

12. In an electrical system, an inductance, a circuit for supplying pulses of current to said inductance, the potential across said inductance being in one direction upon the rise of each pulse of current and reversing upon the decay of each said pulse, circuit-closing means for establishing said circuit, said circuit-closing means being adapted upon closing thereof to cause a pulse of current to be supplied to said inductance and to open before said pulse has completely decayed, means for causing said pulse to continue to flow through said inductance after said circuit-closing means has opened, and means responsive to the reversed potential across said inductance for preventing closing of said circuit-closing means.

13. In an electrical system, an inductance, a first circuit for supplying pulses of current to said inductance in one direction, a second circuit for supplying pulses of current to said inductance in the opposite direction, and means responsive to a difference of potential in said inductance for preventing establishment of said second circuit after said first circuit has been established.

14. In an electrical system, an inductance, a first circuit for supplying pulses of current to said inductance in one direction, a second circuit for supplying pulses of current to said inductance in the opposite direction, and means responsive to a difference of potential in said inductance for preventing establishment of either of said circuits.

HANS KLEMPERER.